United States Patent
Li et al.

(10) Patent No.: US 7,873,236 B2
(45) Date of Patent: Jan. 18, 2011

(54) SYSTEMS, METHODS AND APPARATUS FOR CONSISTENCY-CONSTRAINED FILTERED BACKPROJECTION FOR OUT-OF-FOCUS ARTIFACTS IN DIGITAL TOMOSYTHESIS

(75) Inventors: Baojun Li, Waukesha, WI (US); Gopal B. Avinash, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 812 days.

(21) Appl. No.: 11/846,009

(22) Filed: Aug. 28, 2007

(65) Prior Publication Data

US 2009/0060310 A1 Mar. 5, 2009

(51) Int. Cl.
*G06K 9/40* (2006.01)

(52) U.S. Cl. .................. 382/275; 382/260; 382/274; 358/3.26; 358/3.27; 358/463

(58) Field of Classification Search .............. 382/260, 382/274, 275
See application file for complete search history.

(56) References Cited

U.S. PATENT DOCUMENTS

| 6,624,893 | B1 * | 9/2003 | Schmit et al. .............. 356/511 |
| 6,707,878 | B2 | 3/2004 | Claus |
| 6,766,047 | B2 * | 7/2004 | Muraki et al. .............. 382/149 |
| 6,820,897 | B2 * | 11/2004 | Breed et al. ................ 280/735 |
| 7,027,662 | B2 * | 4/2006 | Baron ........................ 382/275 |

* cited by examiner

*Primary Examiner*—Yosef Kassa
(74) *Attorney, Agent, or Firm*—William Baxter, Esq.; Michael G. Smith, Esq.

(57) ABSTRACT

Systems, methods and apparatus are provided through which in some embodiments during backprojection of filtered two-dimensional into three dimensional image each voxel is analyzed for inconsistent contributions based on at least two criteria and each of the inconsistent contributions is either replaced or excluded from the backprojection.

23 Claims, 5 Drawing Sheets

SYSTEMS, METHODS AND APPARATUS FOR CONSISTENCY-CONSTRAINED FILTERED BACKPROJECTION FOR OUT-OF-FOCUS ARTIFACTS IN DIGITAL TOMOSYTHESIS

FIELD OF THE INVENTION

This invention relates generally to computed tomography imaging, and more particularly to out-of-focus imaging artifacts.

BACKGROUND OF THE INVENTION

Digital X-ray tomosynthesis generates retrospective reconstructed three-dimensional (3D) planar images of anatomy/structure from a series of two-dimensional (2D), low-dose projections that are acquired within a limited angular range. Retrospective reconstruction not only provides depth information of the anatomy/structure that is otherwise unavailable in the conventional 2D radiographs, but also enhances image contrast due to advanced image processing techniques.

However, the full benefit of digital tomosynthesis has not yet been achieved due to the existence of the out-of-focus artifacts. These artifacts present as a "ghost" shadow in the image that alters the background and consequently lowers the contrast of the anatomy/structure of interest. The artifact may present as a false object and could mislead diagnosis. The main cause of the artifact is the limited angular range of acquisition that results in incomplete view sampling of the object space. The problem of reconstruction of the original anatomy/structure is essentially an unsolved under-determined least square problem. Solving under-determined least squares in images is mathematically very difficult and the exact solution does not exist given the amount of unknowns.

One solution is to increase the angular range at acquisition. However, this solution is usually extremely difficult due to many practical reasons.

BRIEF DESCRIPTION OF THE INVENTION

The above-mentioned shortcomings, disadvantages and problems are addressed herein, which will be understood by reading and studying the following specification.

In one aspect, systems, methods and apparatus involves a consistency requirement of the backprojection process to differentiate signals of the true object from the signals of nearby objects. The systems, methods and apparatus properly separate the two types of signals, to suppress the artifacts and restore the contrast of an anatomy/structure of interest.

In another aspect, systems, methods and apparatus are provided through which in some embodiments during backprojection of filtered two-dimensional projections into a three dimensional image, each voxel in the three dimensional image is analyzed for inconsistent contributions based on at least two criteria and each of the inconsistent contributions is either replaced or excluded from the backprojection.

In yet another aspect, a method to suppress out-of-focus artifacts during backprojection of a plurality of two-dimensional projections, in which the backprojecting further comprises for each voxel in a reconstructed three-dimensional image, the method includes storing a plurality of backprojected contributions in a memory and sorting the plurality of backprojected contributions by value into a monotonic order in the memory. The method also includes identifying at least one contribution of the sorted contributions in the memory that is significantly different than other sorted contributions in reference to at least one criteria of significance and replacing each of the at least one identified contribution in the memory with a value selected from at least one of a group of processes. Thereafter, the method also includes combining the replaced contributions in the memory by an operator, wherein the operator includes maximum, minimum, average, or median.

In still another aspect, the criteria of significance includes an intensity of each of the at least one contribution being more than some multiple C of the standard deviation from a mean of the plurality of sorted contributions, an intensity of each of the at least one contribution being within the top or the bottom P percentiles range of all of the plurality of sorted contributions, or an absolute distance between an intensity of each of the at least one contribution to the mean of the plurality of sorted contributions that is more than a value K.

In a further aspect, the group of values consists of a mean of the at least one contribution other than the each of the at least one identified contribution, a median of the at least one contribution other than the each of the at least one identified contribution, another statistic of the at least one contribution other than the each of the at least one identified contribution, a mean of the at least one contribution other than the at least one identified contribution.

In yet a further aspect, a system includes a processor, a storage device coupled to the processor, and apparatus operative on the processor to receive into the storage device a plurality of two-dimensional projections of an object from a plurality of angles, generate into the storage device, three-dimensional images by backprojecting an enhanced plurality of two-dimensional projections, wherein the backprojecting further comprises for each voxel in the reconstructed three-dimensional images, storing all backprojected contributions from the reconstructed three-dimensional image in the storage device, sorting the contributions in the storage device by value into a monotonic order, identifying outlier contributions in the storage device, replacing the outlier contributions in the storage device with a value selected from at least one of a group of values, and combining in the storage device the replaced contributions in the memory by an operator, wherein the operator includes maximum, minimum, average, or median.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, embodiments of methods are described. In the third section, particular implementations are described. Finally, in the fourth section, a conclusion of the detailed description is provided.

System Level Overview

Figure 1:
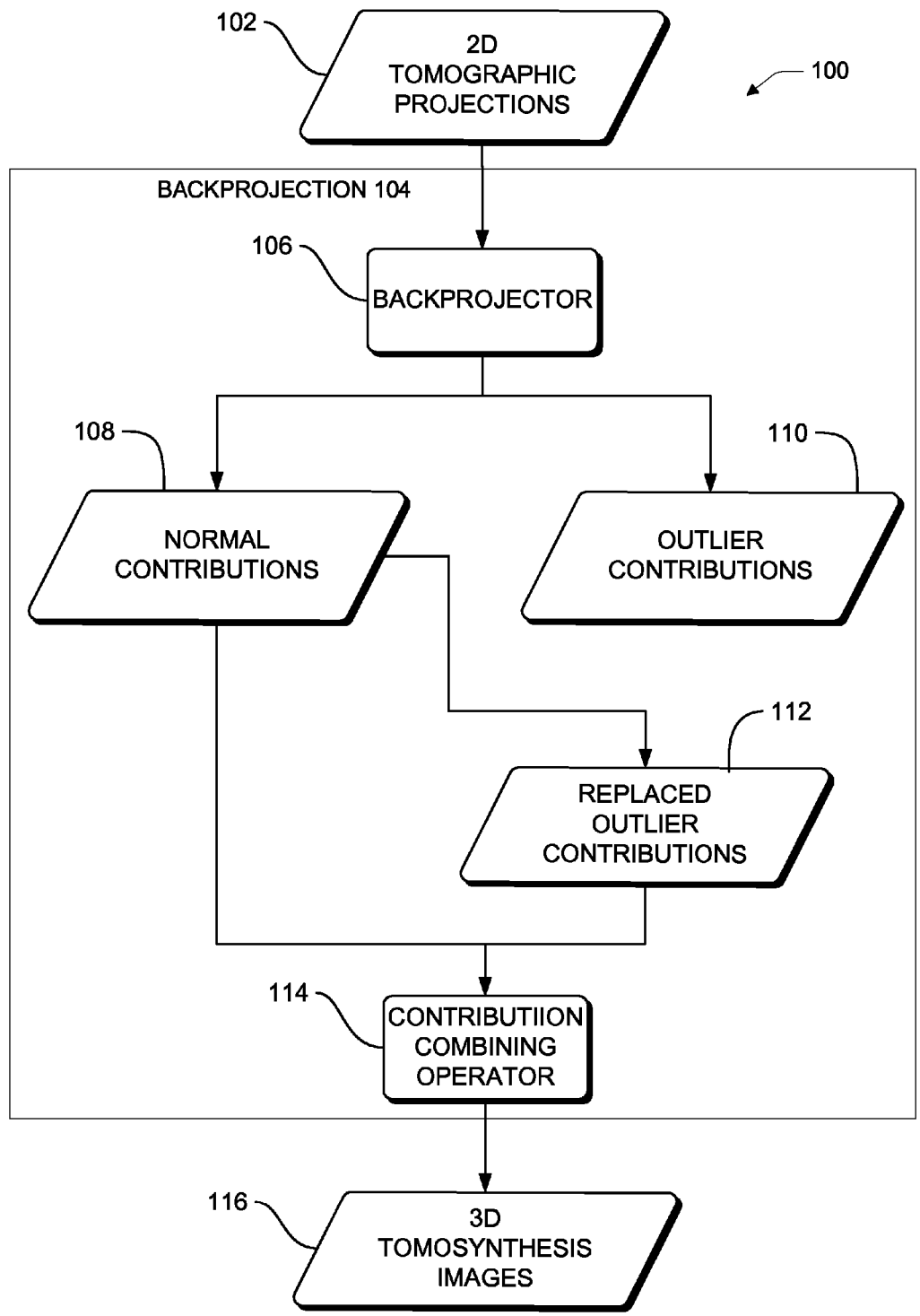
FIG. 1 is a block diagram of an overview of a system to generate three-dimensional images having diminished out-of-focus artifacts.

FIG. 1 is a block diagram of an overview of a system 100 to generate three-dimensional (3D) images having diminished out-of-focus artifacts.

System 100 includes a series (plurality) of two-dimensional (2D) projections 102 that are received during backprojection 104 by a backprojector 106. The term "2D projections" is an abbreviation of "2D projection images." In some embodiments, the 2D projections 102 are filtered, in some embodiments, the 2D projections 102 are not filtered.

The backprojector 106 determines for each voxel in a three-dimensional (3D) image 116, one or more normal contributions 108 or one or more outlier contributions 110. The normal contributions 108 are used to derive replacement contributions 112 to replace 114 the outlier contributions 110.

Figure 5:
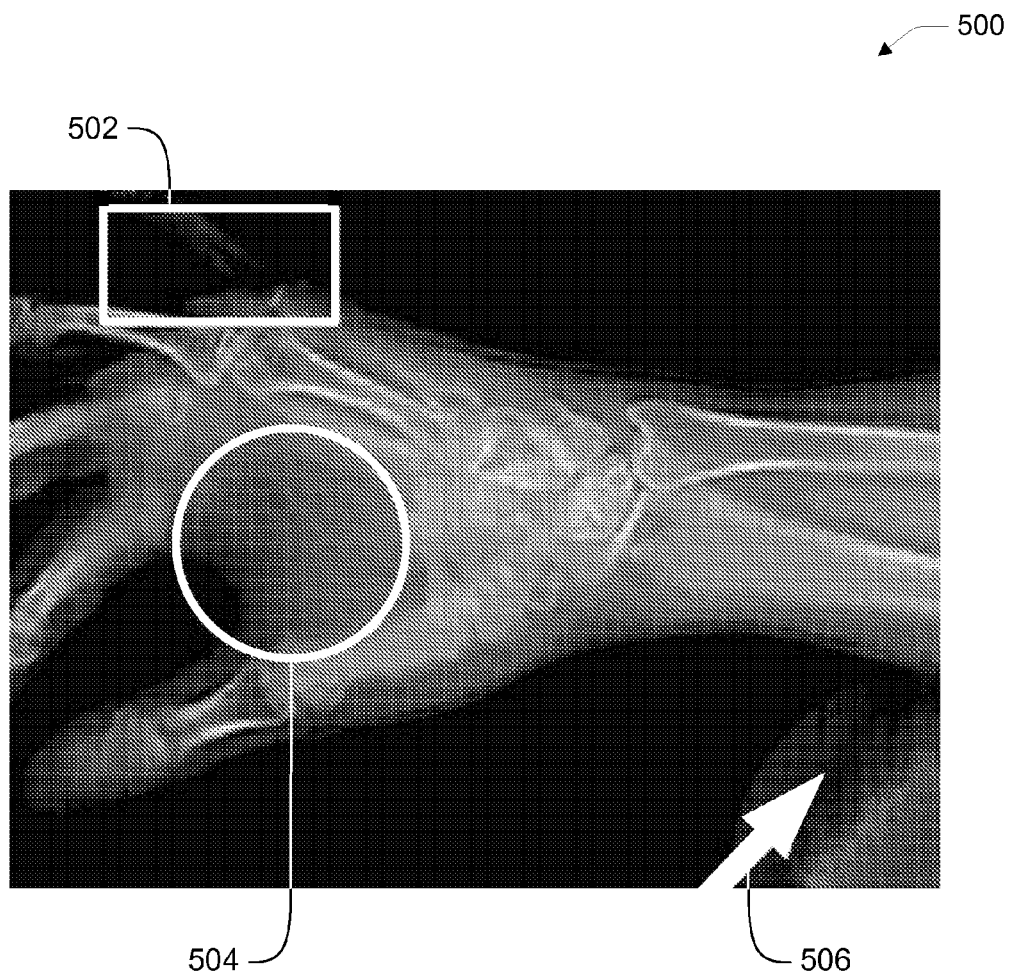
FIG. 5 is a diagram of an image that illustrates the effect of the systems, methods and apparatus described herein.

The 2D projections 102 and the outlier contributions 110 are processed by a backprojector 106 to generate the 3D tomosynthesis images 116. The backprojector 106 is also known as a backfilter. In some embodiments of system 100, the replacement contributions 112 are also used by the backprojector 106 to generate three-dimensional (3D) images 116. System 100 reduces the visual effect of out-of-focus artifacts in the 3D images 116. FIG. 5 below shows one example of a 3D image 116 produced by system 100 with minimal out-of-focus artifacts.

A contribution is an intermediate result of backprojecting an individual 2D projection of the 2D projections 102 with respect to a single pixel in the 3D tomosynthesis image 116. For example, starting with 41 projections in the 2D projections 102, to reconstruct one pixel in the 3D tomosynthesis image 116, 41 contributions will be generated. Furthermore, some of the contributions in the 3D image 116 are considered as outliers 110 based on criteria. The outlier contributions 110 are the root cause of the "out-of-focus artifacts." These outlier contributions 110 can be excluded in order to suppress the "out-of-focus artifacts." In some embodiments, the outlier contributions 110 can be replaced by the contribution derived from normal contributions 108.

While the system 100 is not limited to any particular 2D projections 102, backprojection 104, backprojector 106, normal contributions 108, and outlier contributions 110, replaced outlier contributions 112, contribution combining operator 114 and 3D tomosynthesis projections 116, but for the sake of clarity, a simplified 2D image 102, backprojection 104, backprojector 106, normal contributions 108, and outlier contributions 110, replaced outlier contributions 112, contribution combining operator 114 and 3D tomosynthesis projections 116 are described.

The system level overview of the operation of an embodiment is described above in this section of the detailed description. Some embodiments operate in a multi-processing, multi-threaded operating environment on a computer.

METHOD EMBODIMENTS

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Method 200 is performed by a program executing on, or performed by firmware or hardware that is a part of, a computer.

Figure 2:
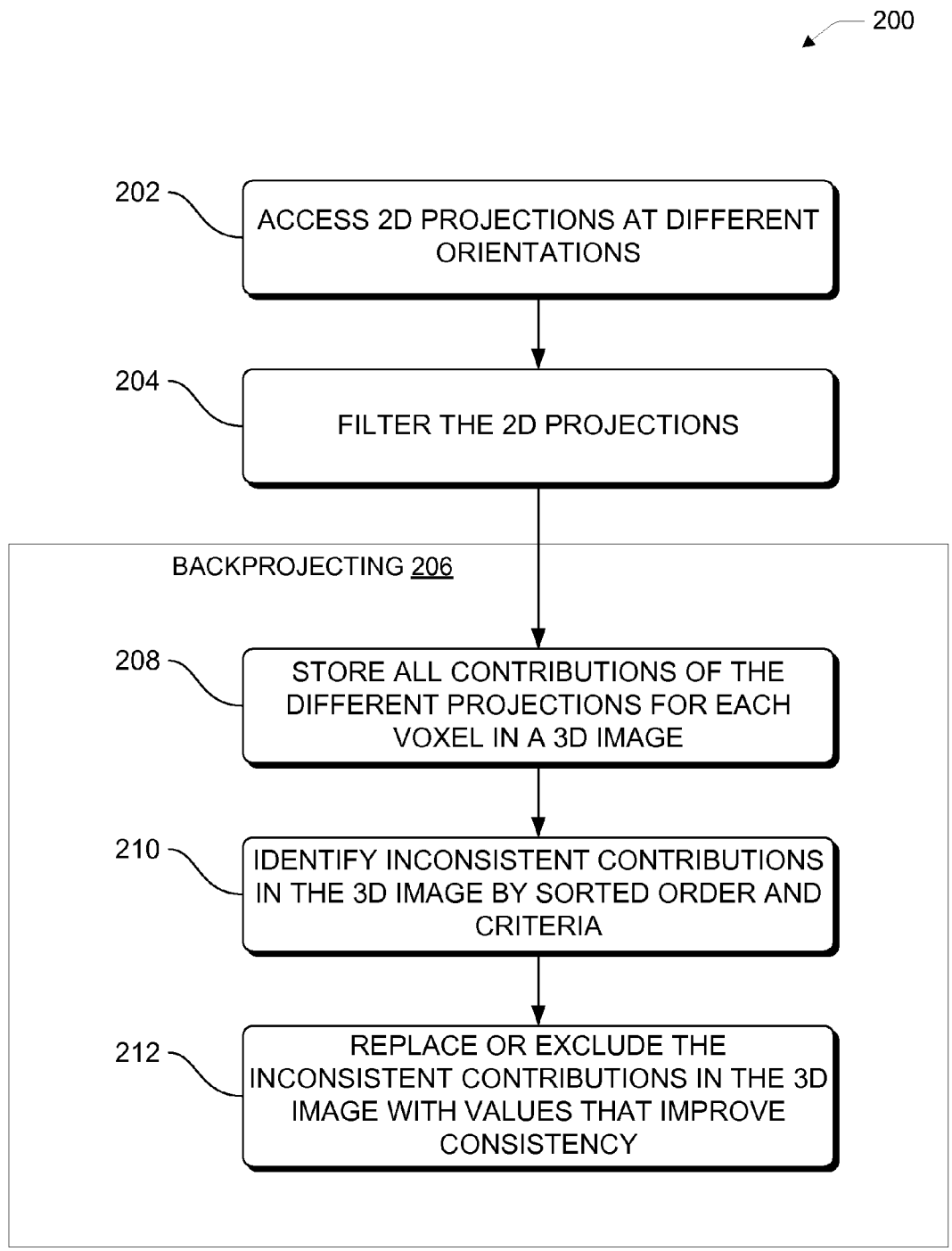
FIG. 2 is a flowchart of a method to suppress out-of-focus artifacts, according to an embodiment.

FIG. 2 is a flowchart of a method 200 to suppress out-of-focus artifacts, according to an embodiment. Method 200 reduces the visual effect of out-of-focus artifacts in backprojected 3D images.

Method 200 includes accessing a plurality of two-dimensional (2D) projections of an object being imaged from a plurality of angles, at block 202. One example of the 2D projections is the 2D projections 102 in FIG. 1 above. The 2D projections are received into a storage device, such as a computer memory, for further processing.

Some embodiments of method 200 also include filtering each of the plurality of two-dimensional projections in the storage device, using a filter, at block 204, in order to enhance structures that are represented in the plurality of 2D projections in the memory.

Method 200 also includes generating into the storage device, 3D image such as 3D image 116 in FIG. 1 above, at block 206. The 3D images are generated by backprojecting the enhanced plurality of 2D projections.

For each voxel in the plurality of 2D projection, the backprojecting 206 includes storing all backprojected contributions from the plurality of 2D projections in the storage device, at block 208, sorting the contributions in the storage device by their values into a monotonic order, identifying inconsistent outlier contributions in the storage device by the sorted order and criteria, at block 210, and replacing the outlier contributions in the storage device with a value selected from at least one of a group of values, at block 212. Other embodiments of method 200 also include combining in the storage device the replaced contributions in the memory by an operator, in which the operator includes maximum, minimum, average, or median. One embodiment of the criteria used at block 210 is described in FIG. 3 below.

In some embodiments, method 200 is implemented as a computer data signal embodied in a carrier wave, that represents a sequence of instructions which, when executed by a processor, such as a processor, cause the processor to perform the respective method. In other embodiments, method 200 is implemented as a computer-accessible medium having executable instructions capable of directing a processor to perform the respective method. In varying embodiments, the medium is a magnetic medium, an electronic medium, or an optical medium.

The following description provides an overview of computer hardware and a suitable computing environment in conjunction with which some embodiments can be implemented. Embodiments are described in terms of a computer executing computer-executable instructions. However, some embodiments can be implemented entirely in computer hardware in which computer-executable instructions are implemented in read-only memory. Some embodiments can also be implemented in client/server computing environments where remote devices that perform tasks are linked through a communications network. Program modules can be located in both local and remote memory storage devices in a distributed computing environment.

A computer includes a processor, commercially available from Intel, Motorola, Cyrix and others. A computer also includes random-access memory (RAM), read-only memory (ROM), one or more mass storage devices, and a system bus, that operatively couples various system components to the processing unit. The memory and mass storage devices are types of computer-accessible media. Mass storage devices are more specifically types of nonvolatile computer-accessible media and can include one or more hard disk drives, floppy disk drives, optical disk drives, and tape cartridge drives. The processor executes computer programs stored on a computer-accessible media.

A computer can be communicatively connected to the Internet via a communication device. Internet connectivity is well known within the art. In one embodiment, a communication device is a modem that responds to communication drivers to connect to the Internet via what is known in the art as a "dial-up connection." In another embodiment, a communication device is an Ethernet® or similar hardware network card connected to a local-area network (LAN) that itself is connected to the Internet via what is known in the art as a "direct connection" (e.g., T1 line, etc.).

A user enters commands and information into a computer through input devices such as a keyboard or a pointing device. The keyboard permits entry of textual information into computer, as known within the art, and embodiments are not limited to any particular type of keyboard. Pointing device permits the control of the screen pointer provided by a graphical user interface (GUI) of operating systems such as versions of Microsoft Windows®. Embodiments are not limited to any particular pointing device. Such pointing devices include mice, touch pads, trackballs, remote controls and point sticks. Other input devices (not shown) can include a microphone, joystick, game pad, satellite dish, scanner, or the like.

In some embodiments, a computer is operatively coupled to a display device. The display device is connected to the system bus. Display device permits the display of information, including computer, video and other information, for viewing by a user of a computer. Embodiments are not limited to any particular display device. Such display devices include cathode ray tube (CRT) displays (monitors), as well as flat panel displays such as liquid crystal displays (LCD's). In addition to a monitor, computers typically include other peripheral input/output devices such as printers (not shown). Speakers and provide audio output of signals. The speakers are also connected to the system bus.

A computer also includes an operating system (not shown) that is stored on a computer-accessible media, the RAM, the ROM, and/or the mass storage device, and is executed by the processor. Examples of operating systems include Microsoft Windows®, Apple MacOS®, Linux®, UNIX®. Examples are not limited to any particular operating system, however, and the construction and use of such operating systems are well known within the art.

Embodiments of a computer are not limited to any type of computer. In varying embodiments, a computer comprises a PC-compatible computer, a MacOS®-compatible computer, a Linux®-compatible computer, or a UNIX®-compatible computer. The construction and operation of such computers are well known within the art.

A computer can be operated using at least one operating system to provide a graphical user interface (GUI) including a user-controllable pointer. A computer can have at least one web browser application program executing within at least one operating system, to permit users of a computer to access an intranet, extranet or Internet world-wide-web pages as addressed by Universal Resource Locator (URL) addresses. Examples of browser application programs include Netscape Navigator® and Microsoft Internet Explorer®.

A computer can operate in a networked environment using logical connections to one or more remote computers. These logical connections are achieved by a communication device coupled to, or a part of, a computer. Embodiments are not limited to a particular type of communications device. The remote computer can be another computer, a server, a router, a network PC, a client, a peer device or other common network node. The logical connections include a local-area network (LAN) and a wide-area network (WAN). Such networking environments are commonplace in offices, enterprise-wide computer networks, intranets, extranets and the Internet.

When used in a LAN-networking environment, a computer and remote computer are connected to the local network through network interfaces or adapters, which is one type of communications device. Remote computer also includes a network device. When used in a conventional WAN-networking environment, a computer and remote computer communicate with a WAN through modems (not shown). The modem, which can be internal or external, is connected to the system bus. In a networked environment, program modules depicted relative to a computer, or portions thereof, can be stored in the remote computer.

A computer also includes at least one power supply. Each power supply can be a battery.

Implementation

Figure 3:
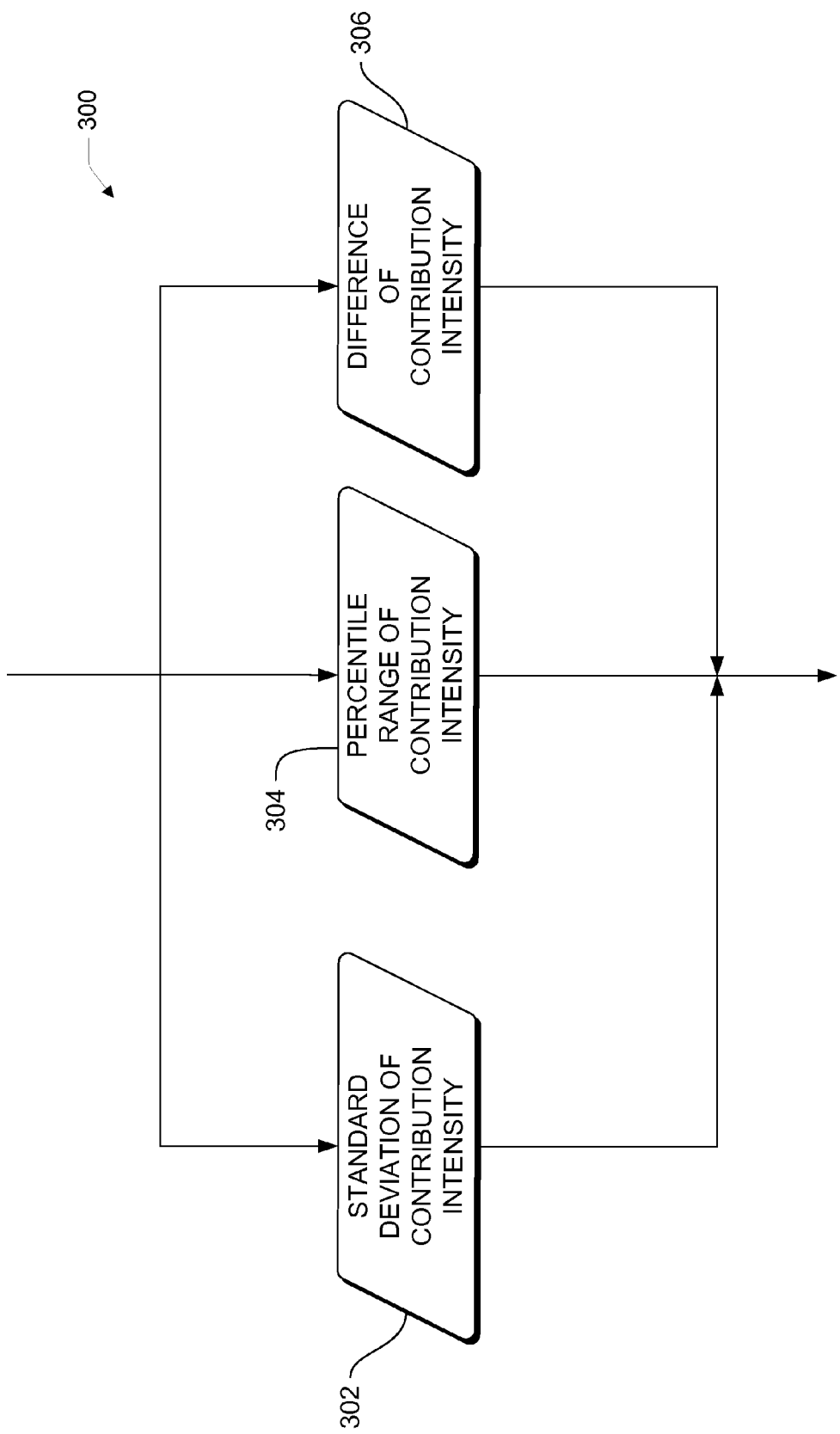
FIG. 3 is a block diagram of criteria of inconsistent contributions for use in an implementation.
Figure 4:
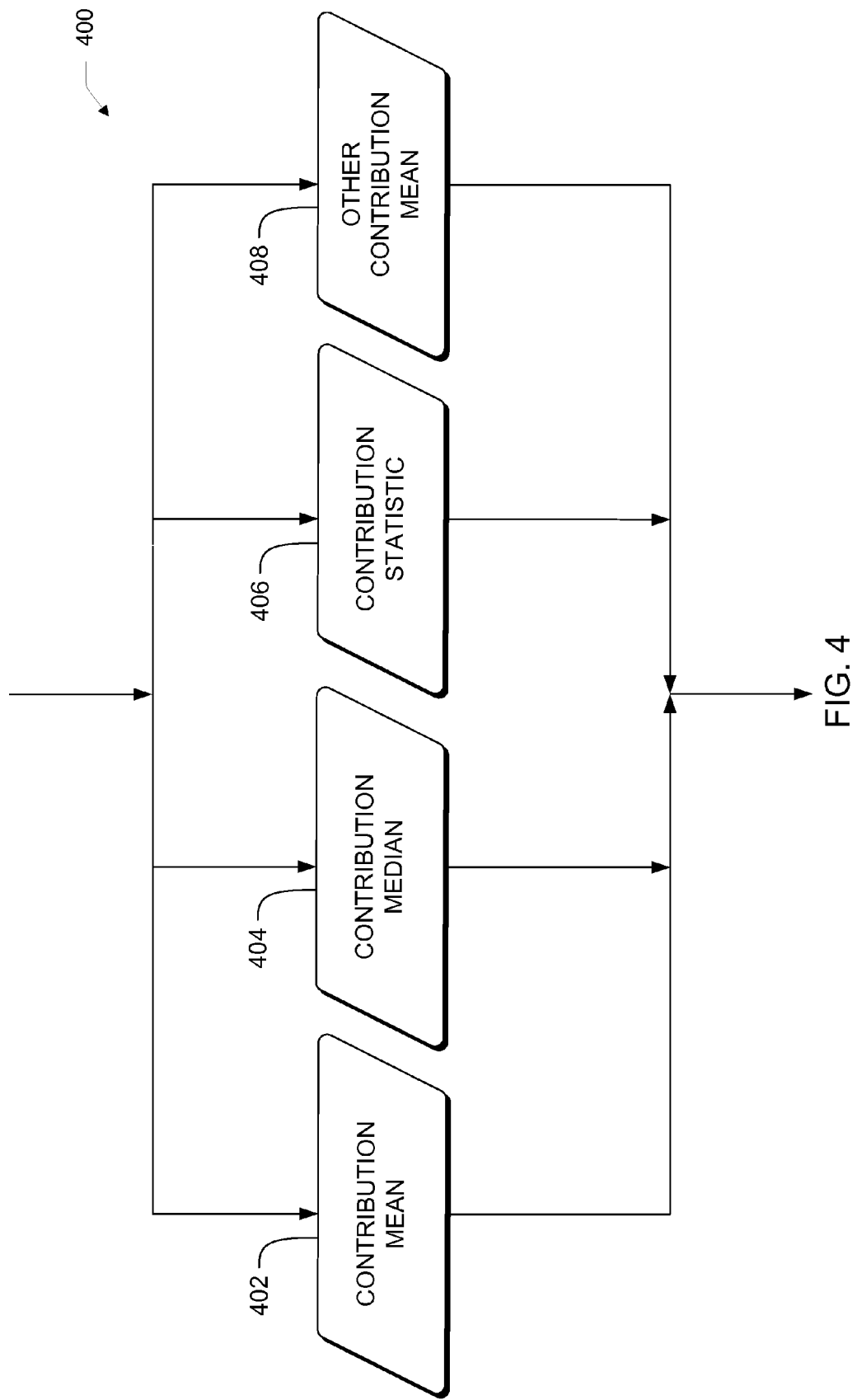
FIG. 4 is a block diagram of replacement values for use in an implementation.

Referring to FIGS. 3-4, particular implementations are described in conjunction with the system overview in FIG. 1 and the method described in conjunction with FIG. 2.

FIG. 3 is a block diagram of criteria of inconsistent contributions 300 for use in an implementation. The criteria for consistency described below in FIG. 3 is used in block 210 in method 200 above to determine if a voxel is deemed to be an outlier, and thus deemed to be a candidate for replacement with another value (at block 212 in FIG. 2) or exclusion from the backfiltering/backprojecting at block 206.

The criteria of significance includes a representation of a measure of intensity 302 of each of the one or more contributions that are more than some multiple 'C' of the standard deviation from a mean of the intensity of the plurality of sorted contributions. In some embodiments, the 'C' number of deviations of intensity 302 beyond which the contribution is considered to be inconsistent is about 1.0 multiples of the standard deviation from a mean of the one or more contributions. A contribution having an intensity that is at least about 1.0 standard deviations away from the mean of the intensity of the contributions is one example, but in other embodiments, other quantities of standard deviations of the intensity of the contribution can implemented to determine if the standard deviation of the intensity of the contribution of the voxel is inconsistent with the general population of contributions of the voxel. For example, in other embodiments, a contribution having an intensity that is at least about 2.5 standard deviations away from the mean of the intensity of the contributions is deemed to be inconsistent.

The criteria of significance includes a representation of a measure of intensity 304 of each of the one or more contributions that are more than within the top or the bottom 'P' percentile range of the intensity of the plurality of sorted contributions. In some embodiments, the 'P' percentile ranking of intensity 304 beyond which the contribution is considered to be inconsistent is about the top 5% and the bottom 5% of the one or more contributions. A contribution having an intensity that is either in the bottom 5% or the top 5% of the contributions is one example, but in other embodiments, other percentile rankings of the intensity of the contribution can implemented to determine if the percentile ranking of the contribution is inconsistent with the general population of contributions. For example, in other embodiments, a contribution having an intensity that is in the top 10% or the bottom 10% of the contributions is deemed to be inconsistent.

The criteria of significance includes a representation of a measure of intensity 306 of each of the one or more contributions that are more than some measure 'K' of the absolute difference from a mean of the intensity of the plurality of sorted contributions. In some embodiments, the 'K' number of units of intensity 306 beyond the mean intensity of contributions which is considered to be inconsistent is in a range of about 25 to about 200 units from the mean of the one or more contributions. A contribution having an intensity that is in a range of about 25 to about 200 units away from the mean of the intensity of the contributions is one example, but in other embodiments, other quantities of difference of the intensity of the contribution can implemented to determine if the difference of the intensity of the contribution of the voxel is inconsistent with the general population of contributions of the voxel. For example, in other embodiments, a contribution having an intensity that is in a range of about 75 to about 125 units away from the mean of the intensity of the contributions is deemed to be inconsistent.

FIG. 4 is a block diagram of replacement values 400 for use in an implementation. The group of values described below in FIG. 4 is used in block 212 in method 200 above to replace contributions of a voxel is deemed to be an outlier (inconsistent) (at block 210 in FIG. 2). The replacement contribution values improve consistency of the collective set of contributions of the voxel.

In one embodiment, the group of replacement values includes a mean 402 of the at least one contribution other than the each of the at least one identified contribution.

In another embodiment, the group of replacement values includes a median 404 of the at least one contribution other than the each of the at least one identified contribution;

In yet another embodiment, the group of replacement values includes another statistic 406 of the at least one contribution other than the each of the at least one identified contribution.

In still another embodiment, the group of replacement values includes a mean 408 of the at least one contribution other than the at least one identified contribution.

FIG. 5 is a diagram of an image 500 that illustrates the effect of the systems, methods and apparatus described herein. Image 500 is reconstructed using the systems, methods and apparatus described herein.

In Image 500, particular regions of interest are highlighted to show the effects of the systems, methods and apparatus described herein. The square region 502 highlights an area of the image 500 of a pinky finger of the patient that is suppressed.

The circle region 504 highlights an area of the image 500 having a "ghost" shadows of a pointer finger of the patient and a middle finger of the patient that are suppressed.

The arrow 506 indicates an area of the image 500 have a "ghost" shadow of a medical zirconium fiducial marker from nearby planes that is removed.

In image 500, graphic definition of bone edge and skinline is improved, showing that the systems, method and apparatus described herein are suitable for out-of-focus artifact reduction.

Apparatus components and methods can be embodied as computer hardware circuitry or as a computer-readable program, or a combination of both. In another embodiment, system 100 in FIG. 1 is implemented in an application service provider (ASP) system.

More specifically, in a computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer, or on at least as many computers as there are components.

CONCLUSION

A backfilter/backprojector is described. A technical effect of the backfiltering/backprojecting is reduction in visual prominence of out-of-focus artifacts in three-dimensional images and improved image quality and less out-of-focus artifacts, especially the out-of-focus artifacts caused by dense objects such as bones, metals, dental fillings, etc. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, imaging and healthcare diagnostic environments and alternate technologies which provide the same functionality as described herein.

We claim:

1. A method to suppress out-of-focus artifacts during backprojection of a plurality of two-dimensional projections, wherein the backprojecting further comprises for each voxel in a reconstructed three-dimensional image the method comprising:

storing a plurality of backprojected contributions in a memory;

sorting the plurality of backprojected contributions by value into a monotonic order in the memory;

identifying at least one contribution of the sorted contributions in the memory that is significantly different than other sorted contributions in reference to at least one criteria of significance;

replacing each of the at least one identified contribution in the memory with a value selected from at least one of a group of values; and combining the replaced contributions in the memory by an operator.

2. The method of claim 1, wherein the criteria of significance includes at least two of:

an intensity of each of the at least one contribution being more than some multiple C of the standard deviation from a mean of the plurality of sorted contributions;

an intensity of each of the at least one contribution being within the top or the bottom P percentiles range of all of the plurality of sorted contributions; or an absolute distance between an intensity of each of the at least one contribution to the mean of the plurality of sorted contributions that is more than a value K.

3. The method of claim 2, wherein the multiple C of the standard deviation from a mean of the at least one contribution further comprise:

about more than 1.0 multiples of the standard deviation from a mean of the at least one contribution.

4. The method of claim 2, wherein the P percentiles range of all of the at least one contribution further comprise:

about a 5% percentile range of all of the at least one contribution.

5. The method of claim 2, wherein the K absolute distance between an intensity of each of the at least one contribution to the mean of the at least one contribution further comprise:

a range of about 25 to about 200 absolute distance between an intensity of each of the at least one contribution to the mean of the at least one contribution.

6. The method of claim 1, wherein the group of values consist of:

a mean of the at least one contribution other than the each of the at least one identified contribution;

a median of the at least one contribution other than the each of the at least one identified contribution;

another statistic of the at least one contribution other than the each of the at least one identified contribution; and a mean of the at least one contribution other than the at least one identified contribution.

7. The method of claim 1 further comprising:

accessing the plurality of two-dimensional projections of an object being imaged from a plurality of angles; and enhancing structures represented in the plurality of two-dimensional projections in the memory.

8. The method of claim 7, wherein enhancing the structures that are represented in the plurality of two-dimensional projections further comprises:

filtering each of the plurality of two-dimensional projections using a filter.

9. The method of claim 1, wherein the operator includes maximum, minimum, average, or median.

10. The method of claim 1, wherein the method is performed iteratively.

11. A computer-accessible medium having executable instructions that are capable of directing a processor to suppress out-of-focus artifacts during backprojection of a plurality of two-dimensional projections, wherein for each voxel in a reconstructed three-dimensional image, the executable instructions perform:

storing a plurality of backprojected contributions in a memory;

sorting the plurality of backprojected contributions by value into a monotonic order in the memory;

identifying at least one contribution of the sorted contributions in the memory that is significantly different than other sorted contributions in reference to at least one criteria of significance, wherein the criteria includes:

an intensity of each of the at least one contribution being more than some multiple C of the standard deviation from a mean of the plurality of sorted contributions;

an intensity of each of the at least one contribution being within the top or the bottom P percentiles range of all of the plurality of sorted contributions; or an absolute distance between an intensity of each of the at least one contribution to the mean of the plurality of sorted contributions that is more than a value K; and replacing each of the at least one identified contribution in the memory with a value selected from at least one of a group of values consisting of:

a mean of the at least one contribution other than the each of the at least one identified contribution;

a median of the at least one contribution other than the each of the at least one identified contribution;

another statistic of the at least one contribution other than the each of the at least one identified contribution;

a mean of the at least one contribution other than the at least one identified contribution; and combining the updated contributions in the memory by an operator, wherein the operator includes maximum, minimum, average, or median.

12. The computer-accessible medium of claim 11, wherein the three criteria further comprise:

an intensity of each of the at least one contribution being more than some multiple C of the standard deviation from a mean of the at least one contribution;

an intensity of each of the at least one contribution being within the top or the bottom P percentiles range of all of the at least one contribution; and an absolute distance between an intensity of each of the at least one contribution to the mean of the at least one contribution that is more than a value K.

13. The computer-accessible medium of claim 12, wherein the multiple C of the standard deviation from a mean of the at least one contribution further comprise:

about 1.0 multiples of the standard deviation from a mean of the at least one contribution.

14. The computer-accessible medium of claim 12, wherein the P percentiles range of all of the at least one contribution further comprise:

about 5% percentile range of all of the at least one contribution.

15. The computer-accessible medium of claim 12, wherein the K absolute distance between an intensity of each of the at least one contribution to the mean of the at least one contribution further comprise:

a range of about 25 to about 200 absolute distance between an intensity of each of the at least one contribution to the mean of the at least one contribution.

16. The computer-accessible medium of claim 11, wherein the value in the replacing action is selected from the group consisting of:

a mean of the at least one contribution other than the each of the at least one identified contribution;

a median of the at least one contribution other than the each of the at least one identified contribution;

another statistic of the at least one contribution other than the each of the at least one identified contribution; and a mean of the at least one contribution other than the at least one identified contribution.

17. The computer-accessible medium of claim 11, wherein the executable instructions further comprise executable instructions:

accessing a plurality of two-dimensional projections of an object being imaged from a plurality of angles.

18. A system comprising:

a processor;

a storage device coupled to the processor; and apparatus operative on the processor to:

receive into the storage device, a plurality of two-dimensional projections of an object from a plurality of angles;

generate into the storage device, three-dimensional images by backprojecting an enhanced plurality of two-dimensional projections, wherein the backprojecting further comprises for each voxel in a reconstructed three-dimensional image:

storing all backprojected contributions from the plurality of two-dimensional projections in the storage device;

sorting the contributions in the storage device by their values into a monotonic order; identifying outlier contributions in the storage device;

replacing the outlier contributions in the storage device with a value selected from at least one of a group of values; and combining in the storage device the replaced contributions in the memory by an operator, wherein the operator includes maximum, minimum, average, or median.

19. The system of claim 18 wherein the apparatus is further operable to:

identify at least one contribution that is significantly different than other contributions in reference to at least one criteria of significance.

20. The system of claim 18 wherein the criteria includes:

an intensity of each of the at least one contribution being more than 1.0 multiples of the standard deviation from a mean of the at least one contribution;

an intensity of each of the at least one contribution being within the top 5% or the bottom 5% percentile range of all of the at least one contribution; or an absolute distance between an intensity of each of the at least one contribution to the mean of the at least one contribution that is more than a range of about 25 to about 200.

21. The system of claim 18 wherein the apparatus further comprises software apparatus.

22. The system of claim 18, further comprising apparatus to enhance structures represented in the plurality of two-dimensional projections further comprising:

a filter operable on each of the plurality of two-dimensional projections.

23. The system of claim 18, wherein the apparatus to replace outlier contributions further comprises apparatus to:

replace each of at least one identified contribution in the storage device with a value of that is significantly different than other contributions in reference to at least one criteria of significance, wherein the value is selected from the group consisting of:

a mean of the at least one contribution other than the each of the at least one identified contribution;

a median of the at least one contribution other than the each of the at least one identified contribution;

another statistic of the at least one contribution other than the each of the at least one identified contribution; and a mean of the at least one contribution other than the at least one identified contribution.

* * * * *